(12) United States Patent
Kaiho et al.

(10) Patent No.: US 11,621,838 B2
(45) Date of Patent: Apr. 4, 2023

(54) INFORMATION PROCESSING DEVICE AND SYSTEM

(71) Applicant: SEIKO EPSON CORPORATION, Tokyo (JP)

(72) Inventors: Hiroshi Kaiho, Nagano (JP); Kaoru Takemae, Nagano (JP); Hiroshi Tatebe, Nagano (JP); Fuminori Hanaoka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/653,877

(22) Filed: Mar. 8, 2022

(65) Prior Publication Data

US 2022/0294621 A1 Sep. 15, 2022

(30) Foreign Application Priority Data

Mar. 10, 2021 (JP) .............................. JP2021-038094

(51) Int. Cl.
| | |
|---|---|
| *G06F 15/00* | (2006.01) |
| *G06F 1/00* | (2006.01) |
| *G06K 15/00* | (2006.01) |
| *H04L 9/08* | (2006.01) |
| *G06F 3/12* | (2006.01) |

(52) U.S. Cl.
CPC .......... *H04L 9/0861* (2013.01); *G06F 3/1204* (2013.01); *G06F 3/1231* (2013.01); *G06F 3/1236* (2013.01); *H04L 9/0819* (2013.01); *G06F 3/1287* (2013.01)

(58) Field of Classification Search
CPC ... H04L 9/0861; H04L 9/0819; G06F 3/1204; G06F 3/1231; G06F 3/1236; G06F 3/1287
USPC ............................. 358/1.15, 1.14, 1.13, 1.1
See application file for complete search history.

(56) References Cited

U.S. PATENT DOCUMENTS

| | | | |
|---|---|---|---|
| 2009/0165096 A1* | 6/2009 | Hughes | .................. H04L 63/08 726/5 |
| 2014/0185092 A1 | 7/2014 | Takasu et al. | |
| 2019/0391776 A1* | 12/2019 | Bindana | ................ G06F 3/1222 |

FOREIGN PATENT DOCUMENTS

WO 2014/106883 A1 7/2014

* cited by examiner

*Primary Examiner* — Douglas Q Tran
(74) *Attorney, Agent, or Firm* — Global IP Counselors, LLP

(57) ABSTRACT

An information processing device includes a key generation portion that generates a first key associated with an electronic device when a processing request for the electronic device is received, a key transmission portion that transmits the first key to a request source of the processing request, a connection controller that when a second key is received from the request source, connects to the electronic device associated with the first key corresponding to the received second key, and a response notification portion that notifies the request source of response data from the electronic device when the response data is received from the electronic device, the response data including screen data used for controlling the electronic device.

9 Claims, 4 Drawing Sheets

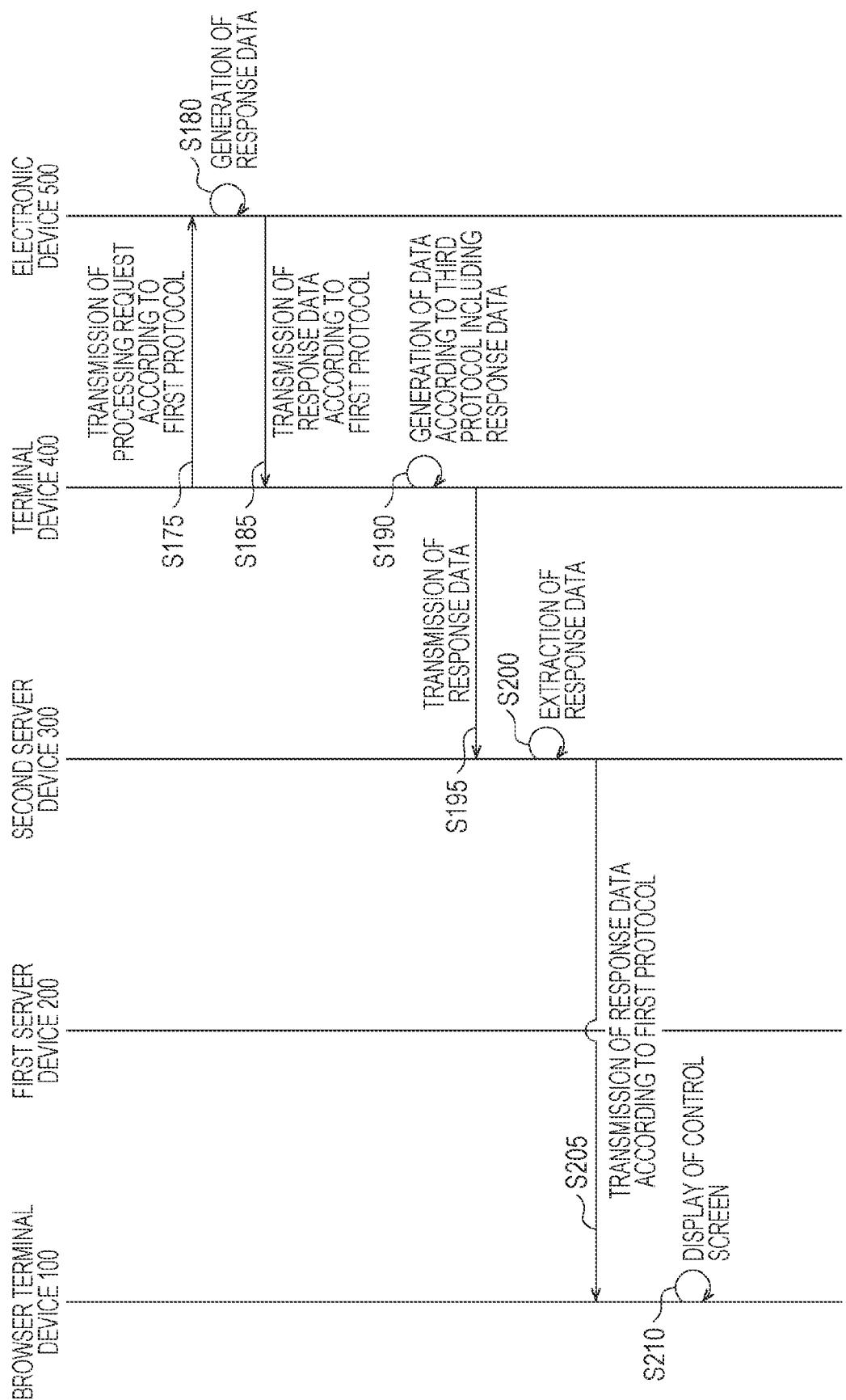

INFORMATION PROCESSING DEVICE AND SYSTEM

The present application is based on, and claims priority from JP Application Serial Number 2021-038094, filed Mar. 10, 2021, the disclosure of which is hereby incorporated by reference herein in its entirety.

BACKGROUND

1. Technical Field

The present disclosure relates to an information processing device and a system.

2. Related Art

There is a technology for communicating with electronic devices such as printers. International Publication No. 2014/106883 discloses a technique for setting a printing device from a web browser in a local network.

In communication with an electronic device, a communication source device may relay another device to communicate with the electronic device. In such a case, there is a demand for improving security, but International Publication No. 2014/106883 has a problem that security cannot be improved.

SUMMARY

According to an aspect of the present disclosure, there is provided an information processing device including a key generation portion that generates a first key associated with an electronic device when a processing request for the electronic device is received, a key transmission portion that transmits the first key to a request source of the processing request, a connection controller that when a second key is received from the request source, connects to the electronic device associated with the first key corresponding to the received second key, and a response notification portion that notifies the request source of response data from the electronic device when the response data is received from the electronic device, the response data including screen data used for controlling the electronic device.

According to another aspect of the present disclosure, there is provided a system including an information processing device, a terminal device, and an electronic device, in which the information processing device includes a key generation portion that generates a first key associated with the electronic device when a processing request for the electronic device is received, a key transmission portion that transmits the first key to a request source of the processing request, a connection controller that when a second key is received from the request source, connects to the electronic device associated with the first key corresponding to the received second key with the terminal device as a relay, and a response notification portion that notifies the request source of response data from the electronic device when the response data is received from the terminal device, the response data including screen data used for controlling the electronic device.

According to still another aspect of the present disclosure, there is provided an information processing device including a request transmission portion that, when an instruction of the processing request for an electronic device is received, transmits a processing request for an electronic device to a predetermined information processing device, and when the first key is received from the information processing device in response to the processing request, transmits a first key associated with the electronic device to a predetermined communication destination, and a display controller that displays, on a display portion, a screen used for controlling the electronic device, based on screen data that is included in response data transmitted from the communication destination in response to the transmission of the first key and is used for controlling the electronic device.

BRIEF DESCRIPTION OF THE DRAWINGS

FIG. 4 is a sequence diagram showing processing of a communication system.

DESCRIPTION OF EXEMPLARY EMBODIMENTS

Here, embodiments of the present disclosure will be described in the following order.
1. Communication System Configuration
2. Communication Processing
3. Other Embodiments

1. Communication System Configuration

Figure 1:
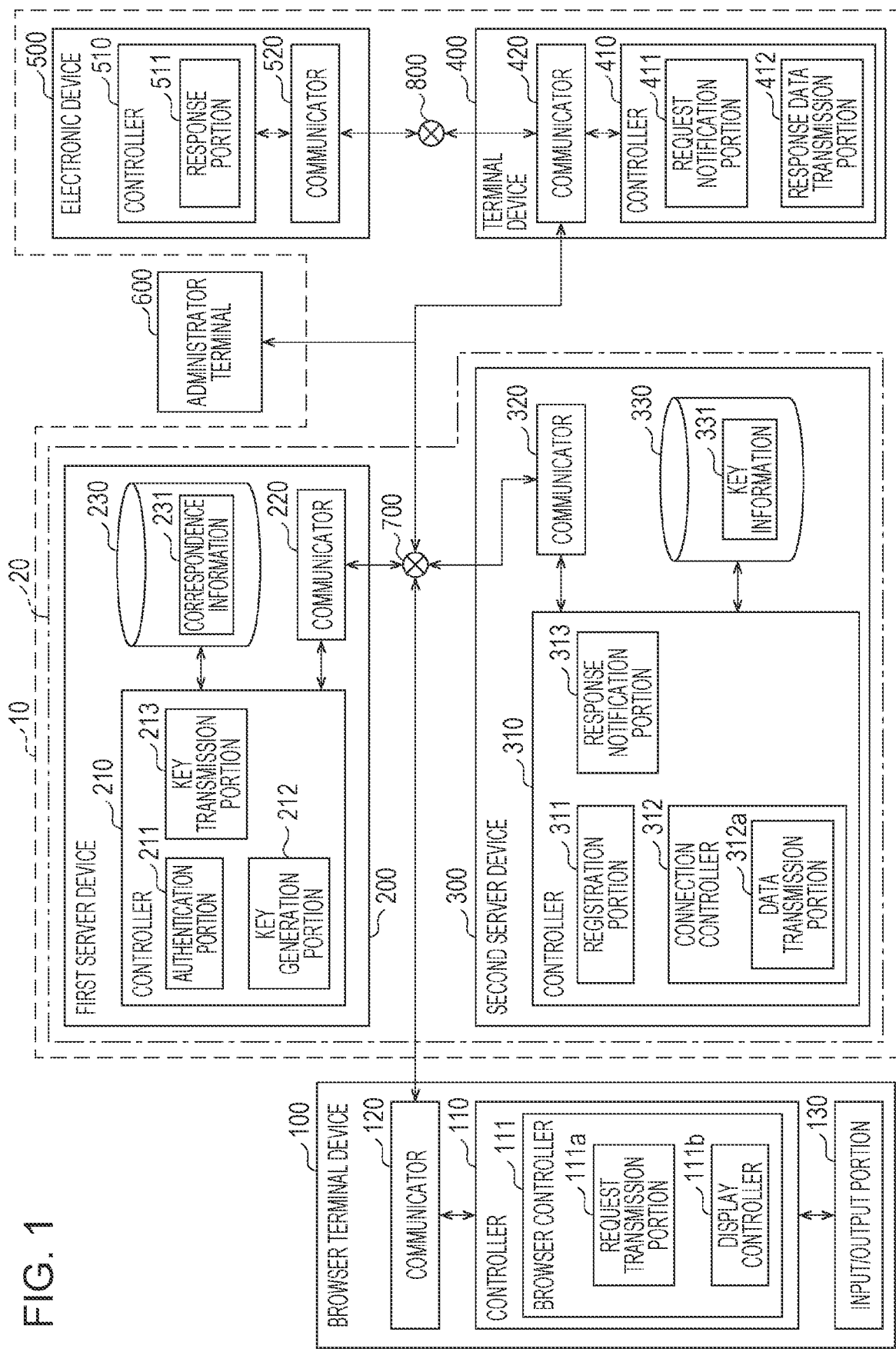
FIG. 1 is a block diagram of a communication system.

FIG. 1 is a block diagram showing a configuration of a communication system 10, a browser terminal device 100, and an administrator terminal device 600 according to an embodiment. In the present embodiment, the communication system 10 is a system that performs communication with the browser terminal device 100. The communication system 10 includes a server device 20, a terminal device 400, and an electronic device 500. The server device 20 is an information processing device including two server devices, a first server device 200 and a second server device 300. The browser terminal device 100, the first server device 200, the second server device 300, the terminal device 400, and the administrator terminal device 600 are each connected to a network 700. Further, the terminal device 400 and the electronic device 500 are each connected to a network 800. The network 700 is a network outside the network 800, and is, for example, a network such as the Internet, a local area network (LAN), or a wide area network (WAN). The network 800 is a network such as LAN or WAN. The terminal device 400 may serve as a gateway of the network 800.

In the present embodiment, each device in the network 800 is configured so as not to be able to receive a request according to the first protocol, which is a predetermined protocol, from outside the network 800. In the present embodiment, the first protocol is hypertext transfer protocol (HTTP), but other protocols such as Telnet may be used. Further, in the present embodiment, HTTP is a concept including hypertext transfer protocol secure (HTTPS). The request processing and response data according to HTTP includes a request line or response line, an HTTP header, and a body which is data to be exchanged. When there is no data to be exchanged, the processing request and response data according to HTTP may not include the body.

In the present embodiment, the terminal device 400, which is the gateway of the network 800, is configured to block the request according to the first protocol from outside the network 800 to devices inside the network 800. However, other configurations may be used as long as each device in the network 800 can be configured so as not to accept the request according to the first protocol from outside the network 800. For example, each device in the network 800 may be configured to, when receiving the request according to the first protocol from outside the network 800, discard the received request.

In the present embodiment, the browser terminal device 100 and the electronic device 500 indirectly perform communication according to the first protocol with the second server device 300 and the terminal device 400 as relays.

Figure 2:
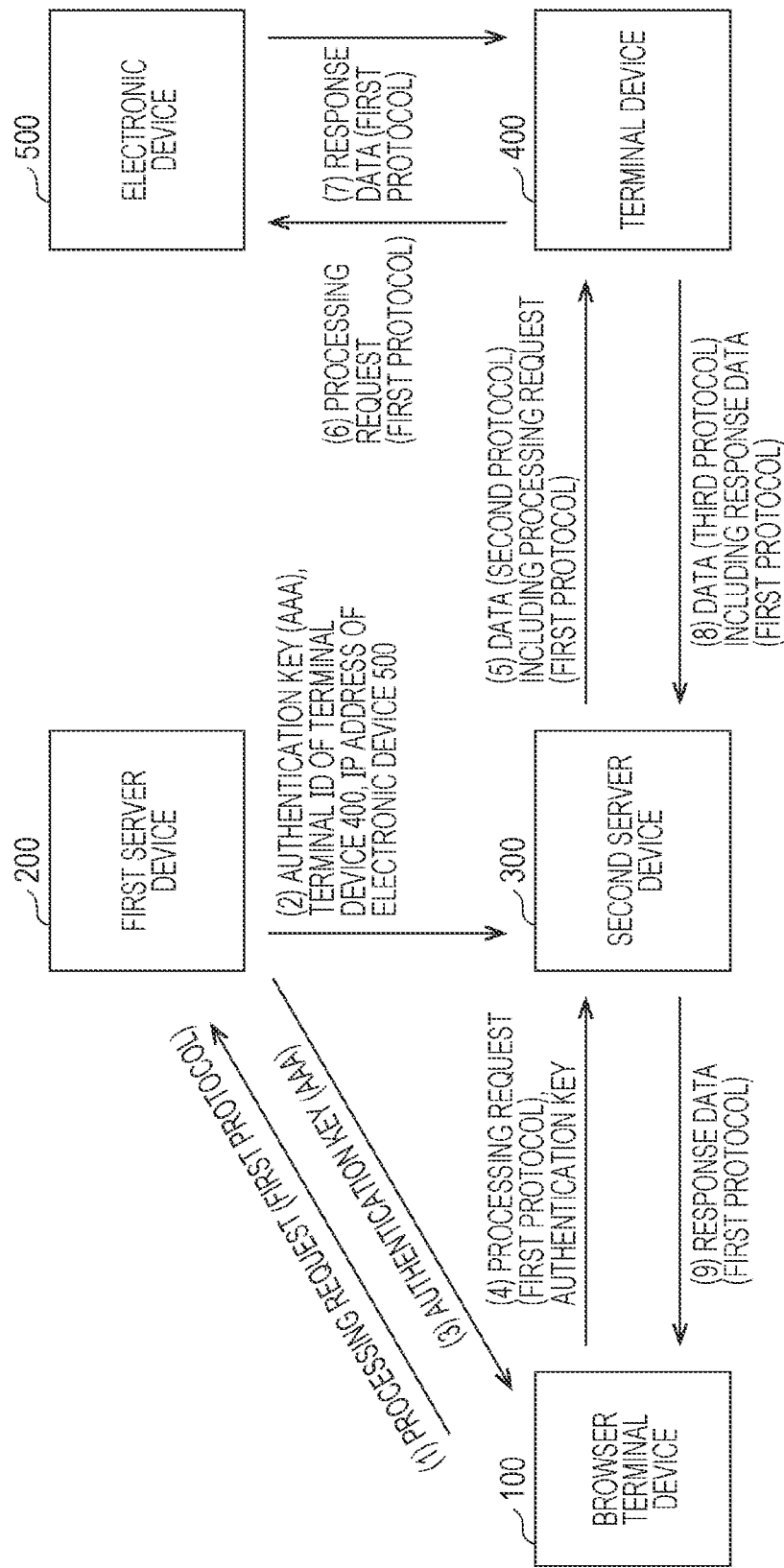
FIG. 2 is a diagram illustrating a data flow in communication.

FIG. 2 is a diagram showing an outline of communication between the browser terminal device 100 and each element of the communication system 10. Hereinafter, each element of the browser terminal device 100 and the communication system 10 will be described with reference to FIGS. 1 and 2.

The browser terminal device 100 is an information processing device having a browser function. In the present embodiment, the browser terminal device 100 is used for remote maintenance of the electronic device 500, but may be used for other purposes such as remote use of the electronic device 500 and confirmation of the usage status of the electronic device 500. The browser terminal device 100 indirectly transmits, to the electronic device 500, a processing request according to the first protocol, and acquires response data from the electronic device 500, by performing communication with the first server device 200 and the second server device 300 through the browser. Here, the processing request is a request for executing processing, and in the present embodiment, the processing request is a request for providing a screen used for controlling the setting change of the electronic device 500, the execution of a specified processing, and the like. In the following, the screen used for controlling the electronic device 500 will be referred to as a control screen. However, the processing request may be a request for other processing such as processing for providing a confirmation screen for setting information, processing for changing the setting, and processing for providing information indicating the usage status of the electronic device 500.

In the present embodiment, the electronic device 500 transmits, to a request source, the response data including screen data for the control screen as a response to the processing request. In the present embodiment, the response data is data for the web page displayed on the browser displayed by the browser terminal device 100, but may be other data such as a dialog. The screen data for the control screen is, for example, image information about the control screen, information indicating each object disposed in the control screen, and the like. Further, when the request source of the processing request knows a displacement mode of each display object such as a button or a display block on the control screen in advance, the screen data for the control screen may be text data such as characters and numerical values displayed on the objects.

The browser terminal device 100 includes a controller 110, a communicator 120, an input/output portion 130, and a recording medium (not shown). The controller 110 includes a central processing unit (CPU), a random access memory (RAM), a read only memory (ROM), and the like. The communicator 120 includes a circuit for communicating with another device by wire or wirelessly. The controller 110 communicates with an external device through the communicator 120. The input/output portion 130 includes an input portion such as a mouse, a keyboard, and a touch panel, and a display portion such as a display.

The controller 110 implements the function of a browser controller 111 by executing a program recorded in the ROM or the recording medium.

The browser controller 111 is a functional portion of displaying a browser on the input/output portion 130 and communicating with an external device through the browser. The browser controller 111 includes a request transmission portion 111a and a display controller 111b.

The controller 110 displays the browser on the input/output portion 130 and accesses the first server device 200 through the displayed browser, by the function of the browser controller 111. When accessing the first server device 200, the controller 110 notifies the first server device 200 of a user's authentication information including the user name and the password. In response to the notification of the authentication information, the first server device 200 determines whether the user is to be authenticated, and when the user is authenticated, transmits, to the browser terminal device 100, a screen used for instructing to transmit the processing request for the electronic device 500. Hereinafter, this screen will be referred to as an instruction screen. In the present embodiment, the instruction screen is a screen including a list of candidates for transmission targets of the processing request, including the electronic device 500. The controller 110 displays the instruction screen acquired from the first server device 200 in the browser displayed on the input/output portion 130. Then, when the controller 110 detects the selection of the electronic device 500 through the instruction screen, the controller 110 determines that the electronic device 500 is selected as the target for transmitting the processing request.

The request transmission portion 111a is a functional portion for transmitting the processing request according to the first protocol to the first server device 200 and the second server device 300 different from the electronic device 500 when receiving the instruction to transmit the processing request through the instruction screen.

When the electronic device 500 is selected as the target for transmitting the processing request through the instruction screen, the controller 110 transmits the processing request for the electronic device 500 to the first server device 200 by the function of the request transmission portion 111a, as shown in (1) of FIG. 2. Here, the processing request for be transmitted includes information indicating the electronic device 500 that is the processing request destination and information indicating the browser terminal device 100 that is the request source of the processing request. In the present embodiment, the controller 110 transmits the processing request according to the first protocol to the first server device 200. However, the controller 110 may transmit a processing request according to a protocol different from the first protocol, such as SPDY, to the first server device 200.

Then, as shown in (3) of FIG. 2, the controller 110 acquires an authentication key transmitted from the first server device 200 as a response to the processing request. Here, the authentication key is a key used for authenticating the browser terminal device 100 in the second server device 300. In the present embodiment, the authentication key is a default character string unique to the corresponding processing request. The character string is, for example, a predetermined number of characters such as 3 characters, 5 characters, and 10 characters. However, the authentication key may be other information such as a bit string as long as it is unique to the corresponding processing request. In the present embodiment, the authentication key is a one-time key that is valid only once. However, the authentication key may be a key that is valid twice or more.

When the controller 110 receives the authentication key from the first server device 200, the controller 110 inputs the URL of the second server device 300 and the received authentication key into an address bar of the browser. However, the controller 110 may input the URL of the second server device 300 in the address bar of the browser based on the operation by the user through the input/output portion 130. In that case, the controller 110 does not have to input the received authentication key in the address bar of the browser.

Then, the controller 110 generates data for the processing request according to the first protocol for the electronic device 500, including the URL input in the address bar of the browser. In the present embodiment, the controller 110 may generate HTTP request data of the GET method as the data for the processing request according to the first protocol for the electronic device 500, but may generate the HTTP request of another method such as the POST method. Then, the controller 110 transmits, to the second server device 300, instead of the electronic device 500, the generated data for the processing request according to the first protocol with the authentication key input in the address bar included. The authentication key transmitted from the controller 110 to the second server device 300 together with the data for the processing request is an example of the second key. (4) of FIG. 2 illustrates the data for the processing request according to the first protocol and the authentication key transmitted from the browser terminal device 100 to the second server device 300. Thereby, the controller 110 transmits, to the electronic device 500, the data for processing request according to the first protocol with the second server device 300 and the terminal device 400 as relays.

As illustrated in (9) of FIG. 2, the display controller 111b is a functional portion for displaying the control screen on the display portion of the input/output portion 130 based on response data from the electronic device 500 to the data for the processing request transmitted from the second server device 300.

By the function of the display controller 111b, the controller 110 receives, from the second server device 300, response data, which is response data of the electronic device 500 to the data for the processing request transmitted by the function of the request transmission portion 111a and includes the information about the control screen. The controller 110 displays the control screen as a web page indicated by the received response data in the browser displayed on the display portion of the input/output portion 130.

Then, when the controller 110 receives a control instruction for the electronic device 500 through the control screen, the controller 110 transmits, to the electronic device 500, the processing request based on the control instruction for the electronic device 500 with the second server device 300 and the terminal device 400 as relays, in the same manner as the processing request for the processing of providing the control screen.

The first server device 200 is an information processing device for receiving the processing request for the electronic device 500 from the browser terminal device 100, generating an authentication key associated with the electronic device 500, and transmitting the generated authentication key to the browser terminal device 100 and the second server device 300. The first server device 200 includes a controller 210, a communicator 220, and a recording medium 230.

The controller 210 includes a CPU, RAM, ROM, and the like. The communicator 220 includes a circuit for communicating with another device by wire or wirelessly. The controller 210 communicates with an external device through the communicator 220. The recording medium 230 records correspondence information 231 indicating correspondence between the electronic device 500 in the network 800 and the terminal device 400 that manages the electronic device 500, various programs, and the like.

The controller 210 implements functions of an authentication portion 211, a key generation portion 212, and a key transmission portion 213 by executing the program recorded in the ROM or the recording medium 230.

The authentication portion 211 is a functional portion for performing authentication of the user of the browser terminal device 100. The controller 210 acquires user authentication information including, for example, a user name and a password, from the browser terminal device 100, and performs authentication of the user based on the acquired authentication information, by the function of the authentication portion 211.

The key generation portion 212 is a functional portion for generating an authentication key associated with the electronic device 500 when receiving the processing request for the electronic device 500. The authentication key generated by the function of the key generation portion 212 is an example of the first key. The controller 210 receives a processing request for the electronic device 500 from the browser terminal device 100 by the function of the key generation portion 212. Then, the controller 210 asks the administrator terminal device 600 whether or not to permit the browser terminal device 100, which is the request source of the processing request, to handle the processing request for the electronic device 500, which is the request destination indicated by the processing request. The administrator terminal device 600 is an information processing device used by the administrator of the electronic device 500. For example, the controller 210 notifies the administrator terminal device 600 of a screen used for selecting whether or not to permit the browser terminal device 100 to handle the processing request for the electronic device 500, and acquires the selection result through the screen from the administrator terminal device 600. When the administrator terminal device 600 selects to permit the processing request for the electronic device 500, the controller 210 generates an authentication key used for authenticating the browser terminal device 100 in the second server device 300. In the present embodiment, the controller 210 generates a character string "AAA" as the authentication key, but may generate data in another format such as another character string or bit string as the authentication key.

However, when the information about a target which is permitted to handle the processing request for the electronic device 500 is recorded in advance on the recording medium 230, the controller 210 does not have to ask the administrator terminal device 600. In that case, when, for example, the request source of the processing request received from the browser terminal device 100 is recorded on the recording medium 230 as the target which is permitted to handle the processing request for the electronic device 500, the controller 210 may generate the authentication key.

Then, the controller 210 associates the generated authentication key with the electronic device 500, which is indicated by the processing request received from the browser terminal device 100. Further, the controller 210 specifies the terminal device corresponding to the electronic device 500, that is, the terminal device that manages the electronic device 500, from the correspondence information 231. In the present embodiment, the terminal device 400 manages the electronic device 500. Therefore, the controller 210 specifies the terminal device 400.

The key transmission portion 213 is a functional portion that transmits the authentication key generated by the function of the key generation portion 212 to the browser terminal device 100 that is the request source of the processing request for the electronic device 500. The controller 210 transmits, to the second server device 300, the authentication key generated by the function of key generation portion 212, information about the electronic device 500 associated with the authentication key, and information about the terminal device 400 corresponding to the electronic device 500, by the function of the key transmission portion 213. In the present embodiment, the controller 210 transmits the IP address in the network 800 of the electronic device 500 and the identification information about the terminal device 400 as the information about the electronic device 500 and the information about the terminal device 400, respectively. Hereinafter, the identification information is referred to as a terminal ID. (2) of FIG. 2 shows the authentication key transmitted from the first server device 200 to the second server device 300, the IP address of the electronic device 500, and the terminal ID of the terminal device 400. In the second server device 300, the transmitted authentication key is registered in association with the information about the electronic device 500 and the information about the terminal device 400.

Further, as shown in (3) of FIG. 2, the controller 210 transmits the authentication key generated by the function of the key generation portion 212 to the browser terminal device 100, and instructs the browser terminal device 100 to transmit data for the processing request to the second server device 300 using the transmitted authentication key. In response to the instruction, as shown in (4) of FIG. 2, the browser terminal device 100 transmits, to the second server device 300, the data for the processing request for the electronic device 500 according to the first protocol together with the received authentication key. However, the controller 210 does not have to instruct the browser terminal device 100 to transmit the data for the processing request to the second server device 300. In that case, the browser terminal device 100 may transmit the processing request to the second server device 300 at a timing specified by the user, for example, through the input/output portion 130. The timing specified by the user includes, for example, a timing at which the URL of the second server device 300 is input to the address bar of the browser.

The second server device 300 is an information processing device for receiving the data for the processing request according to the first protocol for the electronic device 500 and the authentication key from the browser terminal device 100, and performing authentication using the authentication key and communication with the terminal device 400 that manages the electronic device 500. The second server device 300 includes a controller 310, a communicator 320, and a recording medium 330.

The controller 310 includes a CPU, RAM, ROM, and the like. The communicator 320 includes a circuit for communicating with another device by wire or wirelessly. The controller 310 communicates with an external device through the communicator 320. The recording medium 330 records key information 331 including authentication key information, various programs, and the like.

The controller 310 implements the functions of a registration portion 311, a connection controller 312, and a response notification portion 313 by executing a program recorded in the ROM or the recording medium 330.

The registration portion 311 is a functional portion for registering the authentication key information received from the first server device 200. The controller 310 receives the authentication key, the information about the electronic device 500, and the information about the terminal device 400 from the first server device 200, by the function of the registration portion 311. Then, the controller 310 associates the received authentication key with the information about the electronic device 500 and the information about the terminal device 400, and records it on the recording medium 330 as the key information 331.

The connection controller 312 is a function of performing connection to the electronic device 500 corresponding to the authentication key received from the browser terminal device 100, and includes a data transmission portion 312a. The data transmission portion 312a is a functional portion for transmitting, to the terminal device 400, data according to a second protocol, which is a predetermined protocol different from the first protocol, including the processing request according to the first protocol. In the present embodiment, the second protocol is Message Queue Telemetry Transport (MQTT) protocol, which is a stateful protocol, but may be another protocol as long as it can deliver information from a device outside the network 800 to a device inside the network 800. For example, the second protocol may be Constrained Application Protocol (CoAP), Extensible Messaging and Presence Protocol (XMPP), or the like.

The controller 310 performs authentication of the browser terminal device 100 by using the authentication key received from the browser terminal device 100 together with the data for the processing request according to the first protocol, by the function of the connection controller 312. More specifically, the controller 310 determines whether or not the same authentication key as the received authentication key is recorded on the recording medium 330 as the key information 331. The controller 310 authenticates the browser terminal device 100 when it determines that the received authentication key is recorded, and does not authenticate the browser terminal device 100 when it determines that the received authentication key is not recorded. When the browser terminal device 100 is authenticated, the controller 310 specifies, from the key information 331, the IP address of the electronic device 500, which is the information about the electronic device 500 associated with the authentication key, and the terminal ID of the terminal device 400. Then, the controller 310 establishes communication with the terminal device 400 indicated by the specified terminal ID according to the second protocol.

Then, the controller 310 generates data according to the second protocol to be transmitted to the terminal device 400 by the function of the data transmission portion 312a. More specifically, the controller 310 modifies the data for the processing request according to the first protocol received from the browser terminal device 100 as follows. That is, the controller 310 removes the authentication key from the data for the processing request and modifies the URL part of the second server device 300 to be changed to the IP address of the electronic device 500. Then, in the present embodiment, as the data for the main body, the controller 310 generates, in a predetermined data format used in the second protocol, data including the modified data for the processing request according to the first protocol, identification information about the processing request, the IP address of the electronic device 500 acquired from the key information 331 by the function of the connection controller 312, the predetermined port number used for communication related to the data for the processing request, and information indicating whether the data for the main body is Base64 format data. Hereinafter, the identification information about the processing request will be referred to as a request ID. In the present embodiment, the predetermined data format is Javascript (registered trademark) Object Notation (json) format, but may be other data formats such as XML format and Base64.

When the controller 310 receives the data for the processing request for the electronic device 500 from the browser terminal device 100, the controller 310 assigns a request ID that uniquely identifies the received data for the processing request.

An example of the data according to the second protocol generated by the function of the data transmission portion 312a is shown below.

Data example: {"request_id": "abcdefghij", "host": "...", "port": "***", "Base64": false, "body": "GET/http/."}

In the example, the "request_id" key is a key indicating the request ID of the data for the processing request. In the example, the request ID for the data for the processing request is "abcdefghij". The "host" key is a key indicating the IP address of the electronic device 500 that is the request destination of the data for the processing request. In the example, the IP address indicating the request destination of the data for the processing request is "...". The "port" key is a key indicating a predetermined port number used for communication related to the data for the processing request. In the example, the predetermined port number used for communication related to the processing request is "***". The "Base64" key is a key indicating whether or not the data for the main body is Base64 format data. In the example, since the value of the "Base64" key is "false", the data for the main body is not in the Base64 format. The "body" key is a key indicating data for the main body. In the example, the data for the main body is "GET/http /" which is the data according to the first protocol indicating the processing request for the electronic device 500.

In the example, the data for the processing request according to the first protocol included in the data is not in the Base64 format, but may be in the Base64 format. In that case, for example, the terminal device 400 that receives this data may extract, from the received data, processing request for the Base64 format and may convert the extracted data for the processing request into the original format.

The controller 310 transmits the generated data according to the second protocol to the terminal device 400, as a predetermined communication destination, indicated by the terminal ID acquired from the key information 331 by the function of the connection controller 312, as shown in (5) of FIG. 2. In this way, the controller 310 transmits the processing request according to the first protocol to a device in the network 800 by wrapping and encapsulating the processing request according to the first protocol with the data according to the second protocol. The terminal device 400 extracts the processing request according to the first protocol from the transmitted data and transmits the extracted processing request to the electronic device 500. In this way, the controller 310 connects to the electronic device 500 with the terminal device 400 as a relay.

The response notification portion 313 is a functional portion that transmits, to the browser terminal device 100, which is the request source of the processing request, response data of the electronic device 500 to the processing request, which is transmitted from the terminal device 400 in response to the transmission of the data according to the second protocol by the function of the data transmission portion 312a.

The controller 310 receives the response data of the electronic device 500 to the processing request from the terminal device 400 by the function of the response notification portion 313.

In the present embodiment, when the terminal device 400 receives the data according to the second protocol transmitted by the function of the data transmission portion 312a, the terminal device 400 extracts the processing request of the first protocol from the received data. Then, the terminal device 400 transmits the extracted processing request of the first protocol to the electronic device 500 as shown in (6) of FIG. 2, and receives response data according to the first protocol to the processing request from the electronic device 500 as shown in (7) of FIG. 2. The response data includes an HTTP header and a data main body. The terminal device 400 generates data according to a predetermined third protocol including the received response data according to the first protocol and the request ID of the processing request. In the present embodiment, the predetermined third protocol is HTTP, but and may be another protocol such as MQTT. In the present embodiment, the terminal device 400 converts the response data according to the first protocol received from the electronic device 500 into the Base64 format so as to be included in the data according to HTTP. As shown in (8) of FIG. 2, the terminal device 400 transmits the generated data according to the third protocol as a response to the data transmitted by the function of the data transmission portion 312a.

The controller 310 extracts the response data of the electronic device 500 according to the first protocol and the request ID of the processing request, from the data according to the third protocol received from the terminal device 400. The controller 310 specifies, based on the extracted request ID, which processing request the extracted response data corresponds. Then, the controller 310 converts the Base64 format of the extracted response data according to the first protocol into the original format, and transmits the converted data to the browser terminal device 100, which is the request source of the specified processing request, as shown in (9) of FIG. 2.

The terminal device 400 is an information processing device for managing the electronic device 500 and relaying communication between the second server device 300 and the electronic device 500. The terminal device 400 includes a controller 410, a communicator 420, and a recording medium (not shown). The controller 410 includes a CPU, RAM, ROM, and the like. The communicator 420 includes a circuit for communicating with another device by wire or wirelessly. The controller 410 communicates with an external device through the communicator 420.

The controller 410 implements the functions of a request notification portion 411 and a response data transmission portion 412 by executing a program recorded in the ROM or the recording medium.

The request notification portion 411 is a functional portion for transmitting the processing request according to the first protocol to the electronic device 500 based on the data according to the second protocol transmitted from the second server device 300. The controller 410 extracts the processing request according to the first protocol for the electronic device 500 from the data according to the second protocol received from the second server device 300, by the function of the request notification portion 411. Further, the controller 410 also extracts the request ID of the processing request, the port number, and the IP address of the electronic device 500 from the data according to the second protocol received from the second server device 300. Then, the controller 410 records the extracted request ID in the RAM. Further, as shown in (6) of FIG. 2, the controller 410 transmits the extracted processing request according to the first protocol to the extracted port number of the electronic device 500 of the extracted IP address.

In this way, the second server device 300 and the terminal device 400 transmit the processing request according to the first protocol, which is transmitted from the browser terminal device 100 outside the network 800, to the electronic device 500 in the network 800, by the functions of the data transmission portion 312a and the request notification portion 411.

The response data transmission portion 412 is a functional portion for transmitting, to the second server device 300, the response data transmitted from the electronic device 500, as a response to the processing request transmitted by the function of the request notification portion 411.

As shown in (7) of FIG. 2, the controller 410 receives, from the electronic device 500, the response data according to the first protocol of the electronic device 500 to the processing request transmitted by the function of the request notification portion 411, by the function of the response data transmission portion 412. The controller 410 converts the format of the received response data according to the first protocol into the Base64 format. By converting the format of the response data into the Base64 format, the response data can be included in the data according to the third protocol even when the response data includes binary data. Then, the controller 410 generates data according to the third protocol including the converted response data and the request ID of the processing request recorded in the RAM by the function of the request notification portion 411. Then, as shown in (8) of FIG. 2, the controller 410 transmits the generated data according to the third protocol to the second server device 300. In this way, the controller 410 transmits the data according to the third protocol that wraps the response data converted into the Base64 format to the second server device 300, thereby transmitting the response data according to the first protocol to the second server device 300.

The electronic device 500 is a web server device having a function of receiving the processing request through the network and performing processing according to the received processing request, and performs communication with a device in the network 800 according to the first protocol. However, the electronic device 500 does not have to be a web server device as long as it has a function of receiving the processing request according to the first protocol and executing processing according to the received processing request. In the present embodiment, the electronic device 500 is a printer, but, may be another device such as a multifunction device, a scanner, a projector, a PC, an air conditioner, or a lighting device.

The electronic device 500 includes a controller 510, a communicator 520, and a recording medium (not shown). The controller 510 includes a CPU, RAM, ROM, and the like. The communicator 120 includes a circuit for communicating with another device by wire or wirelessly. The controller 510 implements the function of a response portion 511 by executing a program recorded in the ROM or the recording medium.

The response portion 511 is a functional portion for transmitting, to the transmission source of the processing request, response data to the processing request according to the first protocol from an external device. As shown in (6) of FIG. 2, when the controller 510 receives the processing request according to the first protocol from the terminal device 400, the controller 510 generates response data according to the first protocol including the information about the control screen, by the function of the response portion 511. Then, as shown in (7) of FIG. 2, the controller 510 transmits the generated response data according to the first protocol to the terminal device 400, which is the transmission source of the processing request.

As described above, the communication by the first protocol between the browser terminal device 100 and the electronic device 500 is indirectly carried out by the communication system 10, and the control screen is displayed on the browser terminal device 100.

With the above configuration of the present embodiment, the communication system 10 transmits, to the electronic device 500 in the network 800, the processing request according to the first protocol from the browser terminal device 100 outside the network 800, through the second server device 300 and the terminal device 400. Thereby, the communication system 10 can cause the electronic device 500 to execute the processing according to the processing request according to the first protocol even from outside the network 800, which makes it possible to improve the convenience of the electronic device 500.

Further, in the present embodiment, the second server device 300 transmits the response data of the electronic device 500, as the data according to the first protocol, to the processing request to the browser terminal device 100 which is the request source of the processing request. Thereby, the browser terminal device 100 transmits the processing request according to the first protocol, and receives response data according to the first protocol as a response to the transmitted processing request. Thereby, from the perspective of the browser terminal device 100, communication with the electronic device 500 is carried out according to the first protocol. Thereby, the browser terminal device 100 only needs to exchange information with the electronic device 500 according to the first protocol, and thus it is not necessary to have a separate protocol for transmitting and receiving information, and it is possible to communicate with the electronic device 500 more easily.

Further, in the present embodiment, the first protocol is HTTP, and the response data from the electronic device 500 is the data for the web page. Therefore, the browser terminal device 100 can perform communication with the electronic device 500 through the browser according to HTTP and display the response data on the browser. Thereby, the user of the browser terminal device 100 can perform exchange with the electronic device 500 by operating the browser.

Further, in the present embodiment, the second protocol is MQTT protocol. Thereby, the communication system 10 can implement relatively light communication between the second server device 300 and the terminal device 400, and can speed up the communication between the browser terminal device 100 and the electronic device 500.

Further, in the present embodiment, the first server device 200 transmits, to the second server device 300, the information about the electronic device 500 and the terminal ID of the terminal device 400 together with the generated authentication key. The first server device 200 does not transmit, to the browser terminal device 100, the information about the electronic device 500 and the terminal ID of the terminal device 400 together with the generated authentication key. Thereby, the information about the terminal device 400 in the network 800 and the electronic device 500 is not transmitted to the browser terminal device 100, which is the request source of the processing request. Thereby, the communication system 10 can reduce the possibility that the information about the terminal device 400 and the electronic device 500 is leaked through the browser terminal device 100.

Further, in the present embodiment, the first server device 200 generates an authentication key used for authentication of the browser terminal device 100, and the second server device 300 registers, as the key information 331, the authentication key generated by the first server device 200 in association with the electronic device 500 of the processing request destination and the corresponding terminal device 400. Then, the second server device 300 connects to the electronic device 500 associated with the same authentication key as the authentication key received from the browser terminal device 100 together with the processing request, among authentication keys registered as key information 331. Thereby, the second server device 300 connects to the request destination of the processing request associated with the authentication key by receiving the authentication key. Thereby, when the second server device 300 receives a processing request without an authentication key in the communication relayed by another device between the browser terminal device 100 and the electronic device 500, the second server device 300 does not connect to the electronic device 500, which makes it possible to reduce unauthorized connections, and to improve security.

2. Communication Processing

Figure 3:
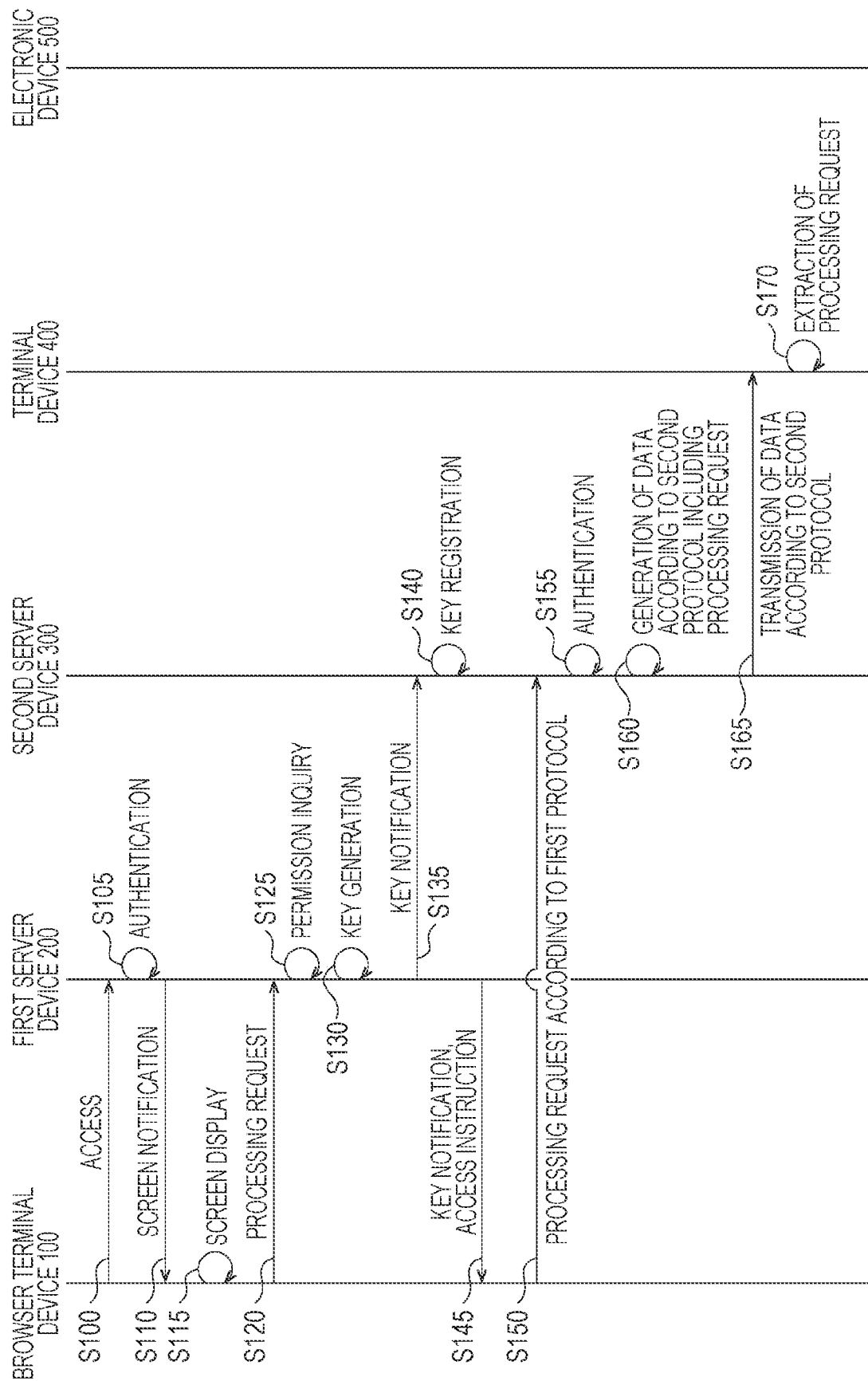
FIG. 3 is a sequence diagram showing processing of a communication system.

FIGS. 3 and 4 are sequence diagrams showing communication processing executed by the communication system 10 and the browser terminal device 100. The sequence diagram of FIG. 3 and the sequence diagram of FIG. 4 are continuous, and are continuous from the lower end of the sequence diagram of FIG. 3 to the upper end of the sequence diagram of FIG. 4.

In S100, the controller 110 of the browser terminal device 100 notifies the first server device 200 of the user authentication information about the browser terminal device 100 and accesses the first server device 200, by the function of the browser controller 111.

In S105, the first server device 200 performs authentication of the user of the browser terminal device 100 based on the authentication information notified in S100, and when the authentication is performed, transmits an instruction screen to the browser terminal device 100.

In S110, the controller 110 acquires the instruction screen transmitted from the first server device 200 in response to the access in S100 by the function of the browser controller 111.

In S115, the controller 110 displays the instruction screen acquired in S110 by the function of the browser controller 111 in the browser displayed on the input/output portion 130.

In S120, when the electronic device 500 is selected as the target for transmitting the processing request through the instruction screen displayed in S115, the controller 110 transmits the processing request for the electronic device 500 to the first server device 200, by the function of the request transmission portion 111a.

In S125, the controller 210 of the first server device 200 receives a processing request for the electronic device 500 from the browser terminal device 100 by the function of the key generation portion 212. Then, the controller 210 inquires the administrator terminal device 600 of whether or not to permit the processing request for the electronic device 500 from the browser terminal device 100.

In S130, When, as a result of the inquiry in S125, it is selected to permit the processing request for the electronic device 500, the controller 210 generates an authentication key used for authentication of the browser terminal device 100 in the second server device 300 by the function of the key generation portion 212, and associates the generated authentication key with the electronic device 500, which is the request destination of the processing request received in S125. Further, the controller 210 specifies the terminal device 400 corresponding to the electronic device 500 from the correspondence information 231.

In S135, the controller 210 transmits, to the second server device 300, the authentication key generated in S130, information about the electronic device 500 associated with the authentication key, and information about the terminal device 400 corresponding to the electronic device 500, by the function of the key transmission portion 213.

In S140, the controller 310 of the second server device 300 receives the authentication key, the information about the electronic device 500, and the information about the terminal device 400 from the first server device 200, by the function of the registration portion 311. Then, the controller 310 associates the received authentication key with the information about the electronic device 500 and the information about the terminal device 400, and records it on the recording medium 330 as the key information 331.

In S145, the controller 210 of the first server device 200 transmits the authentication key generated in S130 to the browser terminal device 100 by the function of the key transmission portion 213, and instructs the browser terminal device 100 to transmit the processing request to the second server device 300 by using the transmitted authentication key.

In S150, the controller 110 of the browser terminal device 100 generates data for the processing request according to the first protocol for the electronic device 500 by the function of the request transmission portion 111a. Then, the controller 110 transmits, to the second server device 300, the generated data for the processing request together with the authentication key transmitted in S145.

In S155, the controller 310 of the second server device 300 determines whether or not the same authentication key as the authentication key received from the browser terminal device 100 in S150 is recorded on the recording medium 330 as key information 331, by the function of the connection controller 312. The controller 310 authenticates the browser terminal device 100 when it determines that the received authentication key is recorded, and does not authenticate the browser terminal device 100 when it determines that the received authentication key is not recorded. When the browser terminal device 100 is authenticated, the controller 310 acquires, from the key information 331, the information about the electronic device 500 associated with the authentication key and the information about the terminal device 400.

In S160, the controller 310 generates data according to the second protocol, including the data for the processing request according to the first protocol received from the browser terminal device 100, the request ID of the processing request, the information about the electronic device 500 of the request destination of the processing request, the predetermined port number, and information indicating whether or not the data for the processing request is Base64 format data, by the function of the data transmission portion 312a.

In S165, the controller 310 transmits the data according to the second protocol generated in S160 to the terminal device 400 by the function of the data transmission portion 312a.

In S170, the controller 410 of the terminal device 400 receives the data according to the second protocol transmitted in S165 by the function of the request notification portion 411. The controller 410 extracts the data for the processing request according to the first protocol for the electronic device 500 from the received data. Further, the controller 410 also extracts the request ID of the processing request, the port number, and the IP address which is the information about the electronic device 500 from the received data according to the second protocol. Then, the controller 410 records the extracted request ID in the RAM.

In S175, the controller 410 transmits the processing request according to the first protocol extracted in S170 to the port number extracted in S170 of the electronic device 500 of the IP address extracted in S170, by the function of the request notification portion 411.

In S180, the controller 510 of the electronic device 500 receives the processing request according to the first protocol transmitted in S175, by the function of the response portion 511. Then, the controller 510 generates the response data according to the first protocol including the information on the control screen.

In S185, the controller 510 transmits the response data according to the first protocol generated in S180 to the terminal device 400, by the function of the response portion 511.

In S190, the controller 410 of the terminal device 400 receives the response data according to the first protocol transmitted in S185 from the electronic device 500, by the function of the response data transmission portion 412. The controller 410 converts the format of the received response data according to the first protocol into the Base64 format. Then, the controller 410 generates data according to the third protocol including the converted response data and the request ID of the processing request recorded in the RAM in S170.

In S195, the controller 410 transmits the data according to the third protocol generated in S190 to the second server device 300, by the function of the response data transmission portion 412.

In S200, the controller 310 of the second server device 300 receives the data according to the third protocol transmitted from the terminal device 400 in S195, by the function of the response notification portion 313. The controller 310 extracts the response data according to the first protocol and the request ID of the processing request, from the data according to the third protocol received from the terminal device 400. The controller 310 specifies which processing request the extracted response data according to the first protocol corresponds to, based on the extracted request ID.

In S205, the controller 310 converts the Base64 format of the response data according to the first protocol extracted in S200 to the original format, and transmits the format-converted data to the browser terminal device 100 which is the request source of the processing request specified in S200.

In S210, the controller 110 of the browser terminal device 100 receives the response data according to the first protocol transmitted from the second server device 300 in S205, by the function of the display controller 111b. Then, the controller 110 displays the control screen in the browser displayed on the display portion of the input/output portion 130 based on the received response data according to the first protocol.

3. Other Embodiments

The above embodiment is an example, and various aspects can be employed. Further, the communication system 10 shown in FIG. 1 may be composed of a larger number of systems. For example, at least one of the elements 200, 300, and 400 of the communication system 10 may be composed of a plurality of devices.

In the above-described embodiment, the server device 20 is composed of two server devices, the first server device 200 and the second server device 300. However, the server device 20 may be one server device having functions of the first server device 200 and functions of the second server device 300. Further, the server device 20 may be composed of three or more server devices among which functions of the first server device 200 and functions of the second server device 300 are distributed.

Further, in the above-described embodiment, the second server device 300 performs authentication of the browser terminal device 100 using the authentication key. However, the second server device 300 does not have to perform authentication of the browser terminal device 100. In that case, the communication system 10 may not include the first server device 200. In that case, the browser terminal device 100 transmits, for example, a processing request according to the first protocol to the second server device 300 without communicating with the first server device 200.

Further, in the above-described embodiment, the terminal device 400 is present for managing the electronic device 500. However, the terminal device 400 that manages the electronic device 500 may not be present. In that case, in the network 800, another gateway different from the terminal device 400 is configured. Then, the electronic device 500 can communicate according to the second protocol, and the second server device 300 may transmit the data according to the second protocol including the processing request according to the first protocol, to the electronic device 500 associated with the authentication key received from the browser terminal device 100. Then, the electronic device 500 may extract the processing request according to the first protocol from the received data according to the second protocol, and transmit the response data including the control screen to the second server device 300 in response to the extracted processing request. Further, in that case, the second server device 300 registers the authentication key in association with the information on the request destination of the processing request, without association with information on the terminal device 400 that manages the electronic device 500, which is the request destination of the processing request.

Further, in the above-described embodiment, the authentication key generated by the first server device 200 is a one-time key that is valid only once. However, the authentication key may be a key having a finite validity period, for example, one hour, one day, one week, or the like. Thereby, by repeatedly using the same authentication key within the validity period when the browser terminal device 100 performs communication with the electronic device 500, it is not necessary to generate the authentication key within the validity period. Further, after the validity period passes, the electronic device 500 cannot be accessed using the authentication key, and unauthorized access is suppressed. By using the authentication key having a finite validity period in this way, the communication system 10 can reduce the burden of the authentication key generation process while maintaining the security.

Further, in the above-described embodiment, the second server device 300 registers the authentication key. In this case, the second server device 300 may register the authentication key in association with user information for the browser terminal device 100. The user information is information that identifies the user, such as a user name and a user ID. For example, the first server device 200 acquires the user information for the browser terminal device 100 that transmits the processing request in S120, and transmits, to the second server device 300, the acquired user information together with the authentication key. In that case, the second server device 300 may associate the authentication key received from the first server device 200 with the user information for the browser terminal device 100 and register it as the key information 331.

Then, the second server device 300 receives the authentication key and the user information from the browser terminal device 100 together with the processing request according to the first protocol. Then, the second server device 300 determines whether or not the received authentication key associated with the received user information is registered in the key information 331. The second server device 300 authenticates the browser terminal device 100 when it is registered, and does not authenticate the browser terminal device 100 when it is not registered. Thereby, the server device 20 does not transmit the processing request to the electronic device 500 in which the authentication key and the user information are not valid, which makes it possible to improve security as compared with the case where authentication is performed without using the user information.

Further, in the above-described embodiment, the browser terminal device 100 performs indirect communication with the electronic device 500 according to the first protocol. However, the browser terminal device 100 may perform communication with the electronic device 500 in another mode, and may perform indirect communication according to another protocol, such as the second protocol, through the second server device 300 and the terminal device 400, for example.

The connection controller only needs to be able to transmit the processing request to the electronic device.

Further, the present disclosure can be applied as a program or a method executed by a computer. Further, the program, and method as described above may be implemented as a single device or may be implemented by using parts provided in a plurality of devices, and include various aspects. In addition, it can be changed as appropriate, such as part being software and part being hardware. Further, the present disclosure is also established as a recording medium of programs. Of course, the recording medium for the program may be a magnetic recording medium, a semiconductor memory, or the like, and any recording medium to be developed in the future can be considered in exactly the same way.

What is claimed is:

1. An information processing device comprising:
a key generation portion that generates a first key associated with an electronic device when a processing request for the electronic device is received;
a key transmission portion that transmits the first key to a request source of the processing request;
a connection controller that when a second key is received from the request source, connects to the electronic device associated with the first key corresponding to the received second key; and
a response notification portion that notifies the request source of response data from the electronic device when the response data is received from the electronic device, the response data including screen data used for controlling the electronic device.

2. The information processing device according to claim 1, wherein
the first key is a key having a finite validity period.

3. The information processing device according to claim 1, wherein
the key generation portion generates the first key with which user information about a user of the request source is associated, and
the connection controller receives the second key from the request source, and connects to the electronic device associated with the first key when the user information associated with the first key corresponding to the received second key is the information about the user of the request source.

4. The information processing device according to claim 1, wherein
the request source is a device having a browser function,
the screen data is a web page, and
the device displays the web page on a browser.

5. The information processing device according to claim 1, wherein
the screen data is data for a screen used for controlling the electronic device.

6. The information processing device according to claim 1, wherein
the connection controller connects to the electronic device with a terminal device that performs communication with the electronic device as a relay.

7. The information processing device according to claim 6, wherein
when the second key is received from the request source, the connection controller specifies the terminal device and an IP address of the electronic device based on the received second key, and connects to the electronic device having the IP address with the specified terminal device as a relay.

8. A system comprising:
an information processing device;
a terminal device; and
an electronic device, wherein
the information processing device includes
a key generation portion that generates a first key associated with the electronic device when a processing request for the electronic device is received,
a key transmission portion that transmits the first key to a request source of the processing request,
a connection controller that when the second key is received from the request source, connects to the electronic device associated with the first key corresponding to the received second key with the terminal device as a relay, and
a response notification portion that notifies the request source of response data from the electronic device when the response data is received from the terminal device, the response data including screen data used for controlling the electronic device.

9. An information processing device comprising:
a request transmission portion that, when an instruction of a processing request is received for an electronic device is received, transmits a processing request for an electronic device to a predetermined information processing device, and when the first key is received from the information processing device in response to the processing request, transmits a first key associated with the electronic device to a predetermined communication destination; and a display controller that displays, on a display portion, a screen used for controlling the electronic device, based on screen data that is included in response data transmitted from the communication destination in response to the transmission of the first key and is used for controlling the electronic device.

\* \* \* \* \*